(12) United States Patent
Lube et al.

(10) Patent No.: US 7,513,527 B2
(45) Date of Patent: Apr. 7, 2009

(54) AIRBAG MODULE

(75) Inventors: Thomas Lube, Berlin (DE); Dirk Meissner, Berlin (DE); Heiko Hofmann, Berlin (DE); Andreas Winkler, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/000,195

(22) Filed: Dec. 10, 2007

(65) Prior Publication Data

US 2008/0150264 A1 Jun. 26, 2008

Related U.S. Application Data

(63) Continuation of application No. PCT/DE2006/001005, filed on Jun. 7, 2006.

(51) Int. Cl.
*B60R 21/26* (2006.01)

(52) U.S. Cl. .................. 280/736; 280/731; 280/740; 280/741; 280/742

(58) Field of Classification Search ............... 280/731, 280/736, 738, 739, 740
See application file for complete search history.

(56) References Cited

U.S. PATENT DOCUMENTS

| 5,234,229 | A | 8/1993 | Gordon |
| 5,799,974 | A | 9/1998 | Honda |
| 6,017,056 | A | 1/2000 | Lee |
| 6,158,770 | A | 12/2000 | Ryan et al. |
| 6,206,408 | B1 * | 3/2001 | Schneider ............. 280/728.1 |
| 6,213,502 | B1 * | 4/2001 | Ryan et al. ............. 280/736 |
| 6,290,257 | B1 | 9/2001 | Bunce et al. |
| 6,406,055 | B1 | 6/2002 | Faigle et al. |
| 6,439,603 | B2 * | 8/2002 | Damman et al. ........... 280/736 |
| 6,471,239 | B1 * | 10/2002 | Nishijima et al. .......... 280/729 |
| 6,471,244 | B1 * | 10/2002 | Nishijima et al. .......... 280/742 |
| 6,736,425 | B2 | 5/2004 | Lemon et al. |
| 7,055,857 | B2 | 6/2006 | Marotzke |
| 7,108,277 | B2 * | 9/2006 | Elqadah et al. .......... 280/728.2 |
| 7,240,918 | B2 * | 7/2007 | Yamada et al. ............ 280/739 |
| 7,401,809 | B2 * | 7/2008 | Lube ..................... 280/739 |
| 2001/0038201 | A1 * | 11/2001 | Ryan ..................... 280/742 |
| 2001/0045734 | A1 | 11/2001 | Damman et al. |
| 2003/0025309 | A1 | 2/2003 | Schenck et al. |

(Continued)

FOREIGN PATENT DOCUMENTS

DE     197 54 280 A1     7/1998

(Continued)

*Primary Examiner*—Toan C To
(74) *Attorney, Agent, or Firm*—Foley & Lardner LLP

(57) ABSTRACT

An airbag module for a motor vehicle having an airbag which can be inflated with gas through an inflation opening in order to protect an occupant, and having a gas generator with which the gas for inflating the airbag can be generated, said gas emerging from at least one gas outlet opening of the gas generator and passing into the airbag through the inflation opening, the airbag module having, according to the invention, a first outflow opening which is assigned an element which can move between at least two different positions and by the movement of which between the two positions the first outflow opening can be connected in a gas-conducting manner to the gas outlet opening of the gas generator so that the gas which flows out through the gas outlet opening is conducted at least partially into the outer space.

39 Claims, 12 Drawing Sheets

U.S. PATENT DOCUMENTS

| | | |
|---|---|---|
| 2003/0193177 A1* | 10/2003 | Elqadah et al. .............. 280/739 |
| 2004/0135356 A1* | 7/2004 | Katsuda et al. .............. 280/739 |
| 2006/0113774 A1* | 6/2006 | Hirose et al. ................. 280/731 |
| 2008/0150265 A1* | 6/2008 | Lube et al. ................... 280/736 |

FOREIGN PATENT DOCUMENTS

| | | |
|---|---|---|
| DE | 198 09 573 A1 | 9/1999 |
| DE | 198 10 537 A1 | 9/1999 |
| DE | 199 35 016 A1 | 2/2000 |
| DE | 102 05 699 A1 | 10/2002 |
| DE | 101 24 273 A1 | 11/2002 |
| DE | 101 39 626 A1 | 3/2003 |
| DE | 101 46 383 | 4/2003 |
| EP | 0 800 967 A2 | 10/1997 |
| EP | 0 974 497 A1 | 1/2000 |
| EP | 1 279 574 A1 | 1/2003 |
| EP | 1 518 763 A1 | 3/2005 |
| WO | WO 98/31570 | 7/1998 |
| WO | WO 02/08025 A1 | 1/2002 |
| WO | WO 03/104046 A1 | 12/2003 |
| WO | WO 2004/094201 A1 | 11/2004 |

* cited by examiner

US 7,513,527 B2

AIRBAG MODULE

CROSS-REFERENCE TO RELATED PATENT APPLICATIONS

This is a continuation of International Application PCT/DE2006/001005 which has an international filing date of Jun. 7, 2006; this International Application was not published in English, but was published in German as WO 2006/131111.

BACKGROUND

The invention relates to an airbag module for a motor vehicle.

An airbag module of this type comprises an airbag, which can be inflated with gas (through an injection orifice) in order to protect a vehicle occupant, and a gas generator, to provide the inflation gas for the airbag. The gas enters the airbag from at least one gas outlet orifice positioned on the gas generator and flows through the injection orifice into the airbag. The injection orifice aids in the improvement of the inflation behavior of the airbag module.

SUMMARY

According to a disclosed embodiment, an airbag module for a motor vehicle is provided. The module includes an airbag which can be inflated with gas through an injection orifice of the airbag in order to protect an occupant. The module also includes a gas generator for generating gas for inflating the airbag. The gas generator is configured so that the gas emerges from at least one gas outlet orifice of the gas generator and passes through the injection orifice into the airbag. The module includes a first outflow orifice on a chamber surrounding the gas generator, to which outflow orifice is assigned an element which is movable at least between two different positions. The module is configured so that the movement of the element between the two positions results in the first outflow orifice being connected to the gas outlet orifice of the gas generator so that the gas flowing out through the gas outlet orifice is conducted at least partially into the outside space. The airbag includes a second outflow orifice which is arranged, in an inflated state of the airbag, in the inside space of the airbag module so that gas emerging from the second outflow orifice passes through the openable region into the outside space. The airbag also includes third outflow orifice which, with an airbag deployed, is arranged in the outside space of the airbag module to allow for the discharge of gas.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
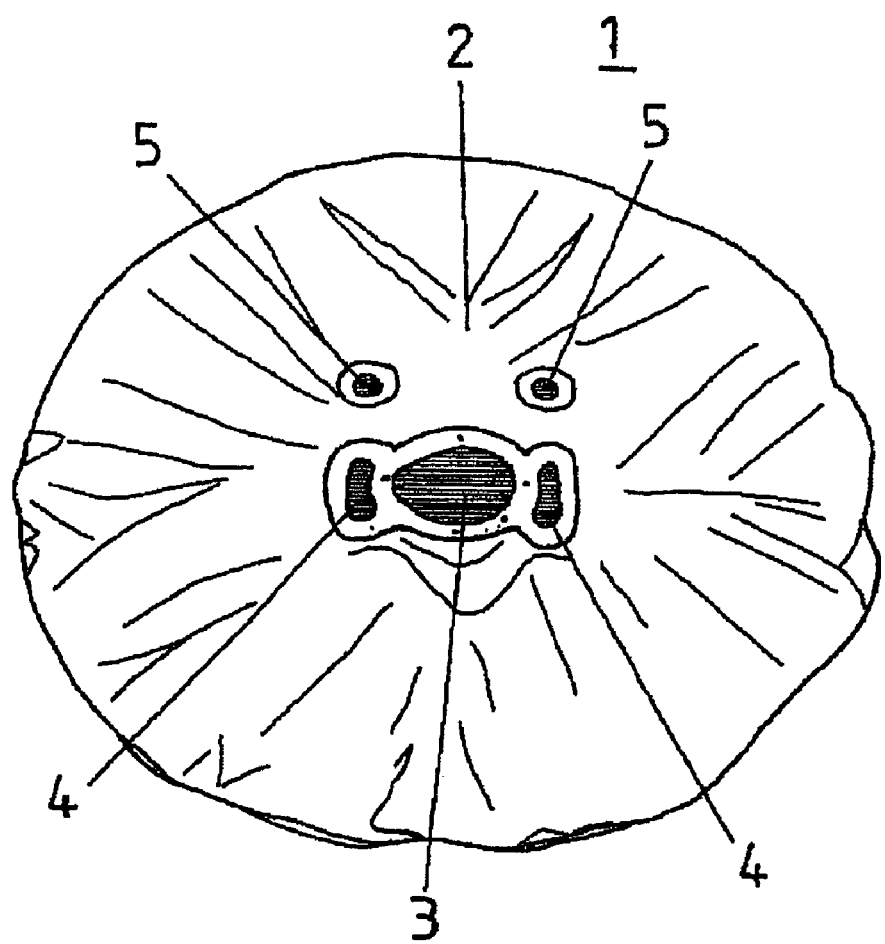
FIG. 1 shows a top view of an airbag with second and third outflow orifices and an injection orifice, according to an embodiment of the invention.

An embodiment of the invention relates to an airbag module that has a first outflow orifice which is assigned an element that is movable between a minimum of two different positions. As a result of this movement, the first outflow orifice is connected to the gas outlet orifice of the gas generator so that the gas flowing out of the gas outlet orifice is conducted partially into the outside space.

This affords the possibility of opening (or of closing) the first outflow orifice (or a plurality of such outflow orifices) as a function of a vehicle accident situation, so that a gas quantity with which the airbag is filled can be adapted to the respective vehicle accident situation. For example, in an out-of-position occupant situation, should the person to be protected by the airbag is, for example, be positioned at an insufficient distance from the airbag in a main deployment direction of the airbag, the first outflow orifice can therefore be opened early, so that the person to be protected is not injured by too highly an inflated airbag.

Since the restraining performance of such an airbag module concept is adapted by the timing of the opening of the first outflow orifice (the timing being a controllable parameter of software used for controlling the first outflow orifice), an airbag module of this type can be adapted and employed in a simple manner throughout a fleet of vehicles.

In an embodiment of the invention, the gas outlet orifice of the gas generator is connected to the first outflow orifice by mechanism of the movable element so that the gas flowing out through the gas outlet orifice is conducted completely into the outside space surrounding the airbag module. Inflation of the airbag, for example in the event of an out of position occupant situation, can be prevented.

An embodiment of the invention relates to an airbag module cover which surrounds the airbag and separates an inside space of the airbag module from an outside space surrounding the airbag module. In the case of a driver's airbag module positioned in a steering wheel, a cover of this type may be, for example, a cover of a hub body of the steering wheel.

The cover contains an opening through which the airbag can be deployed into the outside space of the airbag module. The opening may have, for example, tear-open lines, along which the opening of the cover is torn open by force of the airbag being deployed, which, during inflation, presses against the cover in a main deployment direction.

The first outflow orifice is arranged in the inside space of the airbag module so that the gas passes through the opening into the outside space, thereby protecting an occupant. In addition, for example in the case of a driver's side airbag, there is design freedom with respect to the side of the steering column or of a steering wheel which faces away from the driver, as this side does not have to have a flow-optimized or heat-resistant construction in the case of an outflow of gas through an openable region, opened in the direction of a driver, of a cover of the airbag module.

The movable element is mounted in the airbag module so that the element is displaceable parallel to the main deployment direction of the airbag.

The movable element is mounted so that the element is displaceable and/or rotatable in a movement parallel to the injection orifice.

The airbag module has a chamber which surrounds the gas generator of the airbag module. The chamber serves as protection for the airbag and may have openable (closable) outflow orifices (for introducing gas into the outside space) or a flow-out orifice (for introducing gas into the airbag) or form such outflow orifices as a result of movements of components in the chamber.

In an embodiment of the invention, the movable element is formed by the gas generator, the gas generator being secured to the chamber so that the first outflow orifice is opened as a result of a movement of the gas generator in the movement direction.

The gas generator is configured so that the movement of the gas generator in the movement direction is brought about by mechanism of a pressure generated during the outflow of the gas.

The chamber surrounding the gas generator is formed by a first and a second chamber element, one of the two chamber elements being connected to the gas generator, and the two chamber elements forming a receptacle for the gas generator and being mounted movably with respect to one another in the movement direction, so that they can be moved away from one another in the movement direction of the gas generator, with the result that the first outflow orifice is designed, for example, in the form of a gap, running continuously around the gas generator, at the chamber, that is to say between two continuous margins, facing one another in the movement direction, of the two chamber elements.

The two chamber elements are mounted movably with respect to one another via guide elements extending longitudinally in the movement direction. Guide elements of this type may, for example, be connected in one piece to one of the two chamber elements and project in the movement direction from this chamber element or a further component of the chamber. The other chamber element may then have recesses (for example, continuous holes), into which these guide elements engage, so that this other chamber element is mounted movably in the movement direction on the guide elements, that is to say the guide elements slide through the recesses.

In an embodiment of the invention, the airbag can be secured to the first chamber element, while the gas generator is secured to the second chamber element. In the case of a driver's airbag, the first chamber element, to which the airbag is fastened, is arranged in the main deployment direction of the airbag between the second chamber element and a driver to be protected by the airbag.

The gas generator is fastened to the second chamber element so that the second chamber element is spaced apart from the first chamber element as a result of a movement of the gas generator in the movement direction of the gas generator, the first outflow orifice, for example in the form of a gap running continuously around the gas generator transversely with respect to the movement direction, being formed between the two chamber elements in the movement direction. The first outflow orifice is opened as a result of this movement of the two chamber elements apart from one another.

In an embodiment of the invention, a releasable locking element is provided, which serves for securing the gas generator. Said locking element can fix the gas generator in its initial position during the inflation of the airbag and is activatable by control electronics, so that an unlocking of the locking element can take place at a specific time point as a function of a vehicle accident situation. The gas generator, which presses against the locking element due to the pressure arising during outflow of gas, moves, after a release or unlocking of the locking element, and following the pressure, away from the injection orifice of the airbag in the movement direction into a further position which is spaced apart from the initial position in the movement direction.

The locking element is designed so that it can be brought into engagement with the guide elements (the locking element may, for example, latch positively on the guide elements) in order to secure the gas generator.

The locking element is set up and provided for being brought at least partially out of engagement with the guide elements by mechanism of a linear movement in an unlocking direction running transversely with respect to the movement direction of the gas generator. The locking element has elongated holes which extend longitudinally in the unlocking direction and pierce the unlocking element in the movement direction and at which the guide elements latch in order to secure the generator. For this purpose, these elongated holes may widen in the unlocking direction, the guide elements being introducible in the movement direction into widened regions of these elongated holes and having notches, into which the locking element can engage, with marginal regions which border the elongated holes at their respective narrow regions, so that the guide elements press against these marginal regions in the movement direction and are therefore secured in the movement direction.

A narrow region of a elongated hole and a widened region of a elongated hole which lies opposite in the unlocking direction may be divided off from one another transversely with respect to the unlocking direction by mechanism of a contraction or narrowing of the elongated hole. This is advantageous, as a guide element can thereby be pressed with its annularly continuous notch into the narrow region and be held there by mechanism of the contraction. A displacement of a guide element located in a narrow region in the unlocking direction into a widened region of a elongated hole therefore presupposes a predefinable minimum force and thus reduces the risk of an unintentional unlocking of the locking element.

In another embodiment, a movement generation device is provided, which generates the linear movement of the locking element in order to release the locking element. In this case, this movement generation device has a piston which presses against the locking element in the unlocking direction, the guide elements being displaced out of the narrow regions of the elongated holes into the widened regions of these elongated holes, so that they can slide in the elongated holes transversely with respect to the unlocking direction, that is to say in the movement direction. Broadenings may be formed on the locking elements in the movement direction, so that the locking element does not come completely disengaged with the guide elements as it slides along the guide elements. Therefore, there is a maximum possible distance between the two chamber elements in the movement direction.

In an embodiment of the invention, the first outflow orifice or a plurality of such first outflow orifices are formed on a chamber surrounding the gas generator, the gas generator having a fixed position with respect to the injection orifice (with the exception of compensating movements which are possible due to an oscillating mounting of the gas generator).

In this case, the movable element is mounted movably on this chamber so that the first outflow orifice can be closed or opened by mechanism of the movable element.

In an embodiment of the invention, there is provision for the chamber of the gas generator to have a cylindrical wall in which the first outflow orifice is arranged. In this case, this cylindrical wall may run continuously around the gas generator transversely with respect to the main deployment direction of the airbag of the airbag module. In this instance, the gas outlet orifice of the gas generator (or a plurality of such gas outlet orifices) faces the first outflow orifice (or a corresponding plurality of such first outflow orifices) transversely with respect to the main deployment direction of the airbag, so that the gas can first flow transversely with respect to the main deployment direction out of the chamber surrounding the gas generator.

The movable element has a cylindrical ring with a clearance, the ring being mounted on the wall of the chamber so that the clearance can be brought into congruence with the first outflow orifice as a result of a displacement of the ring along the wall. In this case, the clearance of the ring may have the shape and size of the first outflow orifice. A plurality of first outflow orifices which may be formed along the cylindrical wall, the cylindrical ring has a corresponding plurality of clearances which can be brought into congruence with these first outflow orifices as a result of a displacement of the ring along the wall. A displacement of the ring is understood in this context to mean a rotation of a cylindrical ring about its cylinder axis, that is to say the cylindrical ring can bear against the wall and be rotated against the wall. However, a translation of the ring is not ruled out and is likewise possible (even in combination with rotation).

The clearance (or clearances) of the ring is formed on the ring so that the ring can be rotated or slid with respect to the wall of the chamber into a position in which the ring completely closes the first outflow orifice (or the plurality of first outflow orifices). The clearances may likewise be arranged on the ring so that all the first outflow orifices of the wall are opened in a specific position of the ring with respect to the wall.

To displace the ring in the movement direction, the ring has a recess with a margin extending transversely with respect to the movement direction (in the case of a cylindrical wall, the movement direction runs around the cylindrical wall transversely with respect to the main deployment direction of the airbag, that is to say transversely with respect to the cylinder axis of the cylindrical wall). In a variant of the invention, this recess is designed (open ring) as a gap which interrupts the ring and which extends transversely with respect to the movement direction.

A piston of a movement generation device presses against the margin of the recess in the movement direction, so that the ring is pushed by the piston out of an initial position, in which the first outflow orifice is closed by the ring, into a further position in which the first outflow orifice is opened. By virtue of this advantageous tangential introduction of force, the ring is deformed only slightly. To reinforce the ring, the recess may be formed only partially on the ring, that is to say may not sever the ring completely perpendicularly to the movement direction. In this instance, a narrow further recess is provided which severs the ring transversely with respect to the movement direction and which is formed behind the margin of the recess in the movement direction and runs along this margin, that is to say transversely with respect to the movement direction. If, then, the piston of the movement generation device presses against the margin of the recess in the movement direction, on account of the further recess the ring is not pushed in the movement direction, but, instead, is pulled, which brings about a further minimization of a deformation of the ring caused by the piston action.

By virtue of the above minimization of the deformation of the ring, the ring may have a particularly lightweight design (small wall thickness). Furthermore, the clearance of the ring, which can be brought into congruence with the first outflow orifice in order to open the first outflow orifice, may have a particularly large area as a result of the minimization of the deformation of the ring. The clearance (or clearances) may therefore occupy about half of a surface of the ring which faces the wall of the chamber.

In another embodiment, there is provision for the chamber surrounding the gas generator to have a closable flow-out orifice through which gas generated or released by the gas generator can pass into the airbag in order to inflate the airbag. The flow-out orifice (there may also be a plurality of flow-out orifices) is arranged on a flow-out region, facing the injection orifice of the airbag, of the chamber.

The movable element of the airbag module has a valve plate with an orifice, the valve plate being mounted movably on the wall of the chamber so that the orifice can be brought into congruence with the flow-out orifice as a result of a displacement (rotation) of the valve plate along the flow-out region. A plurality of flow-out orifices formed on the flow-out region, a corresponding plurality of orifices are provided on the valve plate and can be brought into congruence with the flow-out orifices as a result of the displacement or rotation of the valve plate, with the result that the flow-out orifices of the chamber can be opened.

The orifice or orifices is or are formed on the valve plate so that, as a result of the rotation of the valve plate with respect to the outflow region over a predetermined angle, said valve plate closes all the flow-out orifices of the flow-out region of the chamber.

In a variant of the invention, there is provision for the valve plate to be secured to a continuous margin, facing the airbag or the injection orifice of the airbag, of the ring. The movable element may be designed as a flat cylinder open on one side, the ring forming the cylinder wall, and one bottom of this cylinder being formed by the (circular) valve plate.

The orifice of the valve plate is arranged with respect to the clearance of the ring so that the flow-out orifice is closed by the valve plate when the first outflow orifice of the wall of the chamber is open, the flow-out orifice being open when the first outflow orifice is closed by the ring. The same applies correspondingly to a plurality of orifices of the valve plate or flow-out orifices of the chamber and to a plurality of first outflow orifices of the chamber or clearances of the ring.

The additional controllable flow-out orifices of the chamber are advantageous, as not only does an additional flow path for relieving the pressure of the airbag become possible, but the path of the gases into the airbag can be shut off completely, so that a further reduction in the load on the occupants under out of position occupant conditions are possible.

In another embodiment, the airbag has a second outflow orifice (or a corresponding plurality of second outflow orifices) which is arranged, in an inflated state of the airbag, in the inside space of the airbag module so that gas emerging from the second outflow orifice can pass through the openable region of the cover of the airbag module into the outside space surrounding the airbag module.

This is advantageous, as, in an out of position occupant situation (the airbag is blocked up early), because of the high gas pressure in the inside space of the airbag module, good ventilation through such second outflow orifices is possible, so that the loads on the driver in an early phase of the deployment of the airbag are reduced.

In another embodiment, mechanisms are provided which are designed and set up to prevent the situation where the gas emerging from the first and the second outflow orifices can flow opposite to the main deployment direction H.

In yet another embodiment, for the discharge of gas, the airbag has a third outflow orifice which, with an airbag deployed, is arranged in the outside space of the airbag module. Third outflow orifices of this type are advantageous, as they allow a reliable venting of the standing, that is to say already deployed airbag.

In the inflated state of the airbag, the third outflow orifice is arranged on a side which faces the airbag module, that is to say a side of the airbag which faces away from the driver, so that the gases flowing out of the airbag are not aimed directly, or without being swirled around, at the driver or at a person to be protected by the airbag.

A further third outflow orifice is provided, which serves for the discharge of gas and which, with an airbag deployed, is arranged in the outside space of the airbag module. In this case, in the inflated state of the airbag, the further third outflow orifice lies opposite the third outflow orifice transversely with respect to the main deployment direction of the airbag, so that, for example in the case of a symmetrically constructed driver's airbag, as symmetrical a gas radiation behavior as possible is brought about and the airbag can be (spatially) vented uniformly.

Advantageously, the first, second and third outflow orifices may be combined with one another and coordinated with one another. In this case, the second and third outflow orifices in the airbag replace the standard outflow orifices with which an airbag is normally equipped. The coordination of the area of the second outflow orifices in respect of the third outflow orifices, that is to say the coordination of the ratio of these two areas to one another, takes place so that what is known as the in-position performance (the airbag can be deployed freely, unimpeded) corresponds to that of a known standard airbag.

While the second and third outflow orifices are open permanently, the first outflow orifices are switchable or controllable, i.e., the opening of these first outflow orifices takes place as a function of time after the ignition of the gas generator (for example, by mechanism of a pyrotechnic movement generation device). In the event of a premature opening of these first outflow orifices, the mass flow of the gas generator is blown off beneath an airbag tie-up (for example, by the clamping of a marginal region, running continuously around the injection orifice of the airbag, to a generator carrier) and consequently the degree of filling of the airbag is influenced, a more effective restraining performance ("softer" airbag) for lighter occupants being achieved at the same time by mechanism of additional second and third outflow orifices. In the event of a later opening of the switchable or controllable first outflow orifices, the restraining performance for heavy occupants is improved. The deployment of the airbag may be assisted (early restraint due to a rapid airbag provision) by mechanism of a better rectangular identification of the acceleration values (deceleration) of a vehicle occupant in a vehicle accident situation triggering the airbag module. Overall, optimal damping of the airbag as a function of the occupant can be set by the time point of the opening of the additional outflow area (first outflow orifices) being selectable in a directed way. The fixing of the opening time point may take place automatically on the basis of occupant sensing (size, weight, position) and a sensing of crash-dependent data (deceleration, speed).

In out of position occupant situations, there is the possibility, by the very early opening of the switchable first outflow orifices, of additionally minimizing the pressure in the airbag module (in the airbag), in order further to reduce the load acting on the occupant when he is hit by the airbag.

In contrast to known airbag modules, the gases conducted into the airbag module are not conducted through orifices of a generator carrier further downward, that is to say along the steering axle into the steering wheel body, but, instead, are deflected along the steering axle or the main deployment direction of the airbag in the direction of the openable region of the cover of the airbag module. The emergence of the gases therefore takes place along the airbag through the openable region of the cover. Since, even in an out of position occupant situation, the body parts of an occupant which are near the airbag module are covered sufficiently by the airbag, injuries caused by the hot gases which have flowed out are ruled out. In addition, on account of the above-described flow path through the openable region of the cover, no adjacent subassemblies are adversely affected. Additional measures on the steering wheel in order to ensure the outflow are therefore unnecessary. At the same time, the situation is prevented where, for example, the hands are injured on the steering wheel, as would be possible, for example, in the case of an outflow through the steering wheel.

Referring to FIG. 1, an airbag 1 is shown which is designed for use as a driver's side airbag. The airbag 1 is spread out along a plane of extent coinciding with the paper plane and consists of two circular gasbag plies, the continuous margins of which are stitched, adhesively bonded, woven or welded to one another to form the airbag.

The airbag 1 has a side 2 which, in an inflated state of the airbag 1, faces an airbag module 6 (not shown in FIG. 1) or faces away from a driver who is to be protected by the inflated airbag 1.

On the side 2 of the airbag 1, an injection orifice 3 in the form of a circular orifice is provided centrally, through which gas for inflating the airbag 1 can be introduced in the airbag 1.

The airbag 1 has two second outflow orifices 4 which are formed on two mutually opposite marginal regions of the injection orifice 3 and which extend longitudinally along the injection orifice 3. These two second outflow orifices 4 are arranged adjacently to the injection orifice 3 so that, in the inflated state of the airbag 1, they are arranged in an inside space I of the airbag module 6.

The airbag 1 has third outflow orifices 5 which are in each case at a distance from the center of the circular injection orifice 3 which is greater than the distance of the second outflow orifices 4 from the center of the injection orifice 3, this distance being designed to be large enough that, in an inflated state of the airbag I, the third outflow orifices 5 are arranged outside the inside space 1 of the airbag module 6, specifically in the outside space A surrounding the airbag module.

Figure 2:
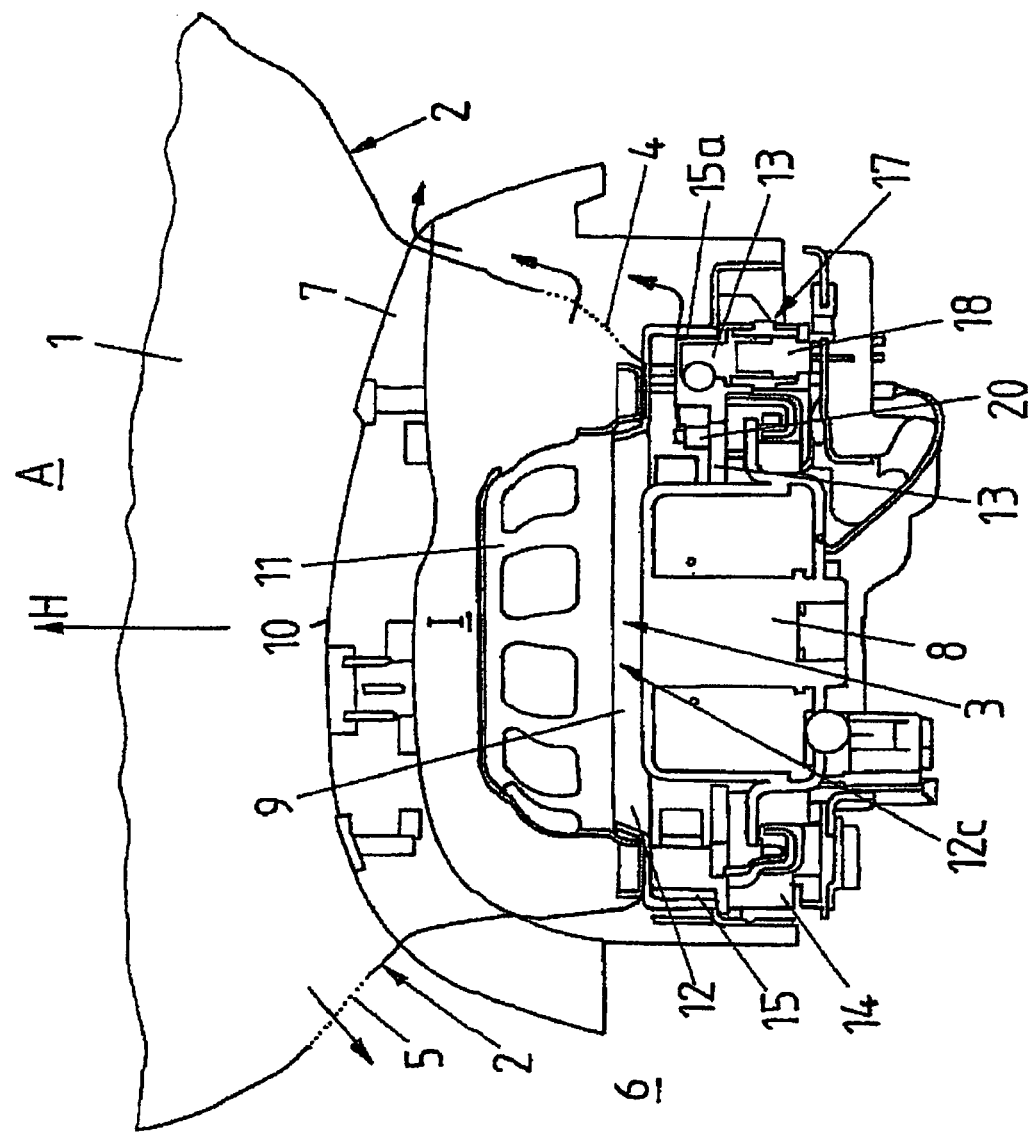
FIG. 2 shows a partial sectional view of an airbag module according to the invention with first, second, and third outflow orifices.
Figure 3:
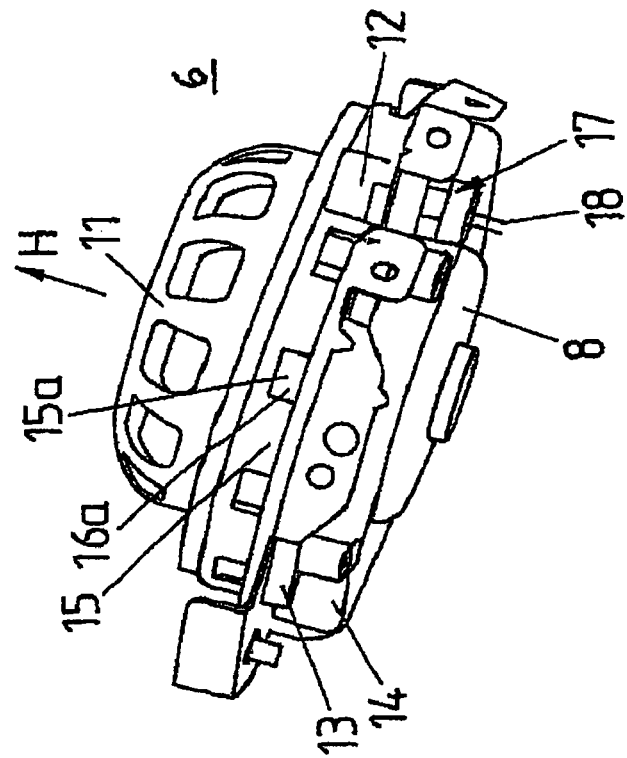
FIG. 3 shows a perspective view of an airbag module with closed first outflow orifices.
Figure 4:
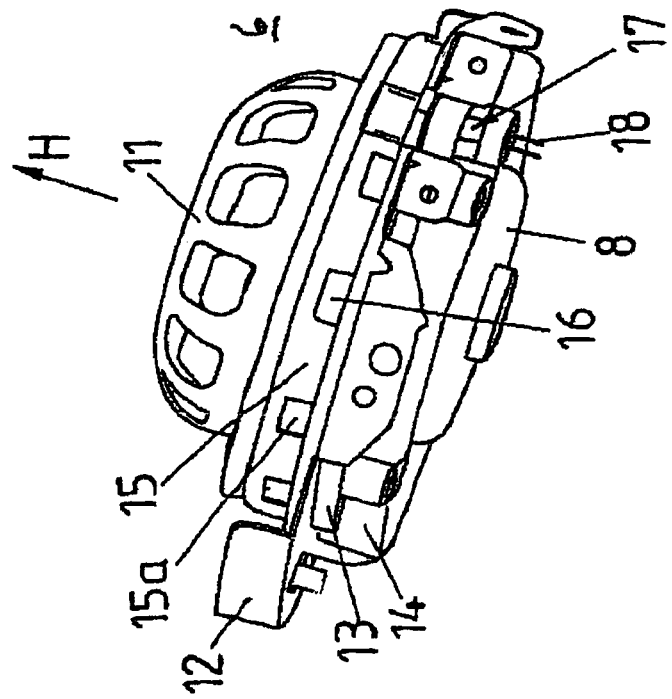
FIG. 4 shows a sectional view of the airbag module shown in FIG. 3, with opened first outflow orifices.
Figure 6:
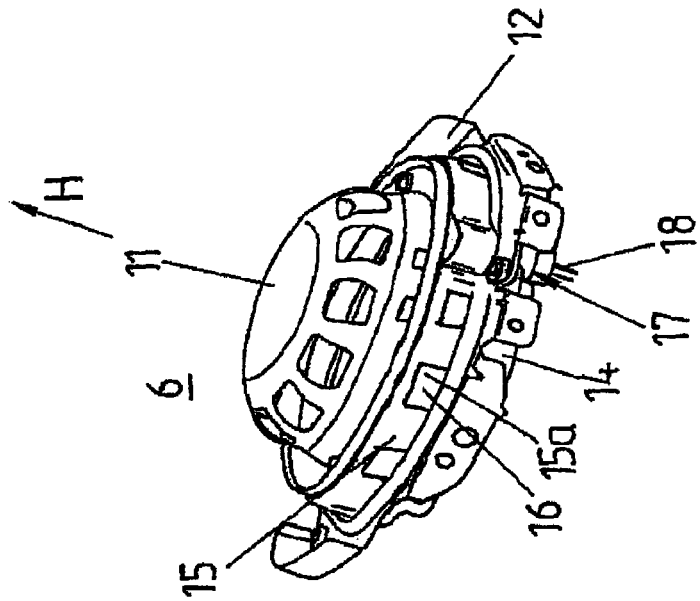
FIG. 6 shows a perspective view of the airbag module shown in FIG. 5 (in an assembled state).

FIG. 2 shows, in conjunction with FIGS. 3-7, a partial sectional view of the airbag module 6 which has a cover 7 which forms a receptacle for the airbag 1 of the airbag module 6 and for a gas generator 8 and a chamber 9, surrounding the gas generator 8, of the airbag module 6.

The cover 7 of the airbag module 6 separates the inside space I from the outside space A of the airbag module 6. Furthermore, on the cover 7 of the airbag module 6, an openable region 10 is provided, which tears open, for example along predefined tear-open lines, when as a result of the gas pressure building up in the airbag 1, the airbag 1 presses from the inside space I against the openable region 10 of the cover 7 of the airbag module 6 in a main deployment direction of the airbag. The inside space I is defined in this context to mean the space which the airbag 8 occupies in its un-inflated state. The inside space I is delimited by the unopened cover 7 in the main deployment direction H of the airbag 1.

FIG. 2 shows the airbag module 6 after the airbag 1 (an extract of which is illustrated in FIG. 2) has spread out through the openable region 10 of the cover 7 into the outside space A of the airbag module 6, the third outflow orifices 5 of the airbag 1 being arranged in the outside space A, and the second outflow orifices 4 being arranged in the inside space I of the airbag module 6. The flow path is identified diagrammatically in FIG. 2 by corresponding arrows.

While the gas located in the airbag 1 can flow through the third outflow orifice 5 directly into the outside space A, the gas is introduced through the second outflow orifice 4 first into the inside space I and from there along the airbag 1 through the openable region 10 into the outside space A.

The chamber 9 surrounding the gas generator 8 is formed by a cap-shaped diffuser 11, a generator carrier 12, a bottom plate 13 and a carrier 14 for the gas generator 8 mounted oscillatably on the generator 8. The diffuser 11 has a cap-shaped design and projects in the main deployment direction H through the injection orifice 3 into the (inflated) airbag 1, a marginal region which runs continuously around the injection orifice 3 of the airbag 1 being arranged in the main deployment direction H of the airbag between a continuous marginal region 11a of the diffuser 11 and a continuous marginal region 12a, which runs continuously around a central orifice 12c, facing the injection orifice 3, of the generator carrier 12, and being clamped (airbag clamping) between these two marginal regions 11a, 12a facing one another in the main deployment direction H.

The diffuser 11 and the generator carrier 12 are via four fastening elements 11b which project longitudinally from the marginal region 11a of the diffuser 11 in the main deployment direction H (the four fastening elements 11b are arranged along the annular marginal region 11a equidistantly from the next respective adjacent fastening element along the marginal region 11a). These four fastening elements 11b are guided through corresponding holes 12b which are formed on the marginal region 12a of the generator carrier 12, so that free end portions of these fastening elements 11b project from a side of the marginal region 12a of the generator carrier 12 which faces away from the diffuser 11. These projecting free end portions are introduced, furthermore, into corresponding (continuous) holes 13a of the bottom plate 13, the holes 13a being formed in cylindrical fastening regions 13b of the bottom plate 13 which (like the holes 13a) are in alignment with the fastening elements 11b and the main deployment direction H.

The bottom plate 13 possesses a central circular gas generator clearance 13c which lies opposite the central orifice 12c of the generator carrier 12 and the injection orifice 3 of the airbag 1 in the main deployment direction H.

The cylindrical gas generator 8 is introduced in the main deployment direction H into the gas generator clearance 13c of the bottom plate 13. The gas generator 8 is connected oscillatably to a carrier 14 of trough-shaped design via a flange 8a which projects from the gas generator 8 transversely with respect to the main deployment direction H and which runs continuously around the gas generator 8 transversely with respect to the main deployment direction H. An oscillatable tie-up of the gas generator 8 to the carrier 14 via the flange 8a is not absolutely necessary. Furthermore, the flange 8a itself may be shaped as the carrier 14, so that the carrier 14 and gas generator 8 are connected to one another directly.

The carrier 14 is secured to free ends of the end portions of the fastening mechanism 11b which are led through the holes 13a of the bottom plate 13 and closes the chamber 9 of the gas generator 8 on a side lying opposite the diffuser 11 in the main deployment direction H.

Furthermore, the generator carrier 12 has a cylindrical wall 15 which is oriented perpendicularly to the central orifice 12c of the generator carrier 12 and which runs continuously around the central orifice 12b of the generator carrier 12 annularly transversely with respect to the main deployment direction H. A plurality of first outflow orifices 15a are formed on this wall 15 of the generator carrier 12 and can be closed or opened by mechanism of a movable element in the form of a cylindrical ring 16.

For this purpose, the cylindrical ring 16 is designed so that it bears against an inside, facing the gas generator 8, of the cylindrical wall 15 and is displaceable between two positions in a movement direction B running transversely with respect to the main deployment direction H and running continuously around the cylindrical wall 15 transversely with respect to the main deployment direction H, that is to say the cylindrical ring 16 can be rotated about its cylinder axis coinciding with the main deployment direction H.

Clearances 16a having the configuration of the outflow orifices 15a of the wall 15 are provided on the ring 16 and are arranged along the cylindrical ring 16 so that they can be brought completely into congruence with the first outflow orifices 15a of the wall 15. In the event that the first outflow orifices 15a and clearances 16a are brought into congruence, the first outflow orifices 15a are opened completely, so that gases provided by the gas generator 8 can pass through the first outflow orifices 15a into the inside space I and from there into the outside space A of the airbag module 6. By the ring 16 being rotated or displaced, the clearances 16a of the ring 16 can be brought out of congruence with the first outflow orifices 15a of the wall 15 of the generator carrier 12. In this instance, the first outflow orifices 15a are closed completely by the ring 16.

Figure 7:
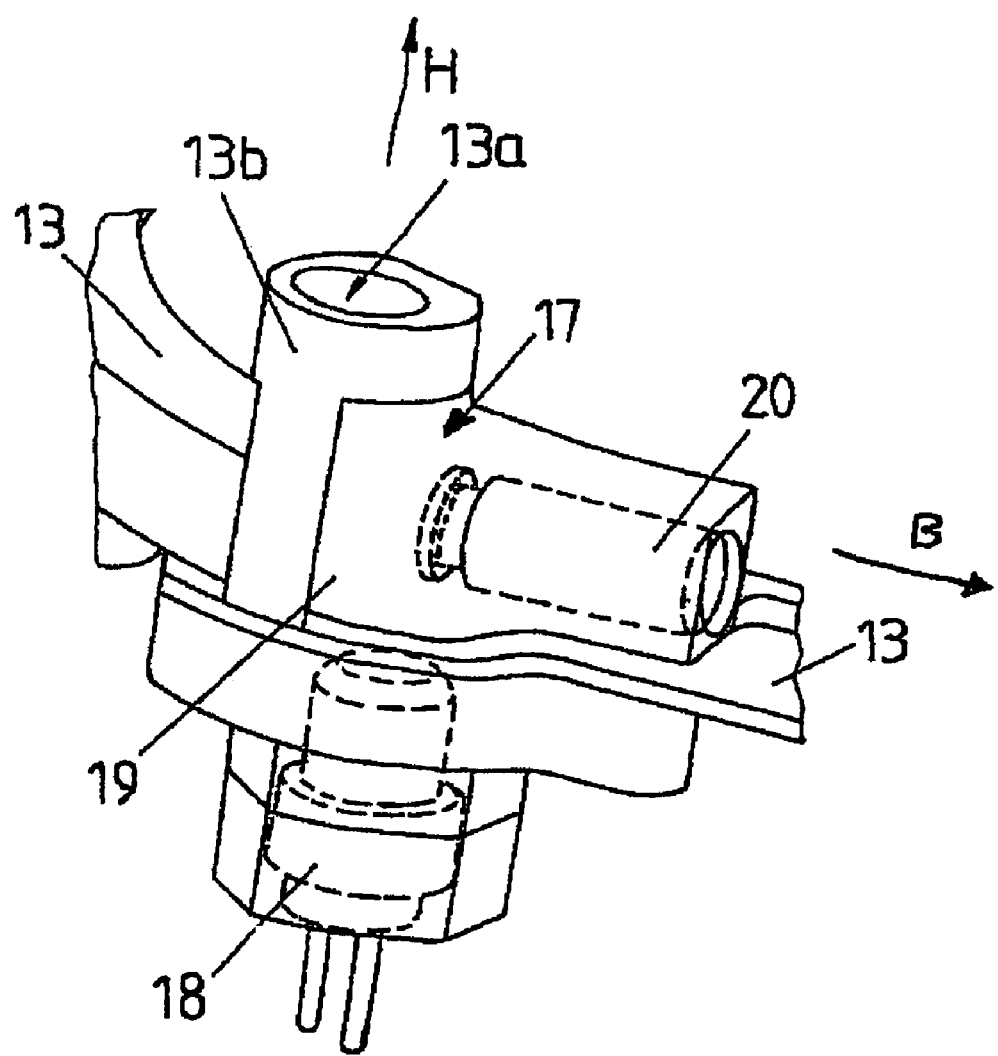
FIG. 7 shows a pyrotechnic movement generation device with an igniter and a piston.

So that the cylindrical ring 16 can be displaced in the movement direction B in order to open the initially closed outflow orifices 15a, a movement generation device 17 according to FIG. 7 in the form of a pyrotechnic actuator is provided on the bottom plate 13.

According to FIG. 7, the movement generation device 17 has an igniter 18 which is ignitable, by mechanism of control electronics and which can generate in a pressure chamber 19 formed in the bottom plate 13 an excess pressure which can press a longitudinally extended piston 20, mounted movably in the pressure chamber 19, out of the pressure chamber 19 in the movement direction B.

To transmit the piston movement, the piston 20 is arranged in the movement direction B in a recess 21 of the ring 16, which recess interrupts the ring 16 in the movement direction B, the piston 20 being arranged so that, due to an excess pressure provided in the pressure chamber 19, it presses in the movement direction B against a margin 22, running transversely with respect to the movement direction B, of the recess 21 of the ring 16, so that the ring is rotated in the movement direction B with respect to the wall 15 in order to open the first outflow orifices 15a. The recess 21 may also be a clearance 16a in the ring 16.

It is advantageous with regard to the arrangement of the piston 20 in the recess 21 of the ring 16 that the piston 20 is arranged in the movement direction B between the margin 22, facing the piston 20, of the recess 21 and a further margin, lying opposite the margin 22 in the movement direction B, of the recess 21, specifically so that said piston can press tangentially with respect to the ring 16 against that edge 22 of the ring 16 which faces it. Deformations are thereby mitigated, which may occur if a piston 20 of this type presses, spaced apart radially from the ring 16, against a region projecting from the ring, in order to rotate the ring with respect to the wall 15. That is to say, owing to the above-described arrangement of the piston 20, the ring 16 can be produced in an optimized way in terms of material and of weight.

So that the ring 16 can be displaced reliably along the wall 15 of the generator carrier 12 by the piston 20, guide mechanism, which guide the cylindrical ring 16 in the movement direction B, are provided on the generator carrier 12 and/or the bottom plate 13. The bottom plate 13 has a guide mechanism of this type, specifically in the form of a step which runs continuously around the gas generator clearance 13c and along which a margin, facing the bottom plate 13, of the ring 16 can slide.

Figure 5:
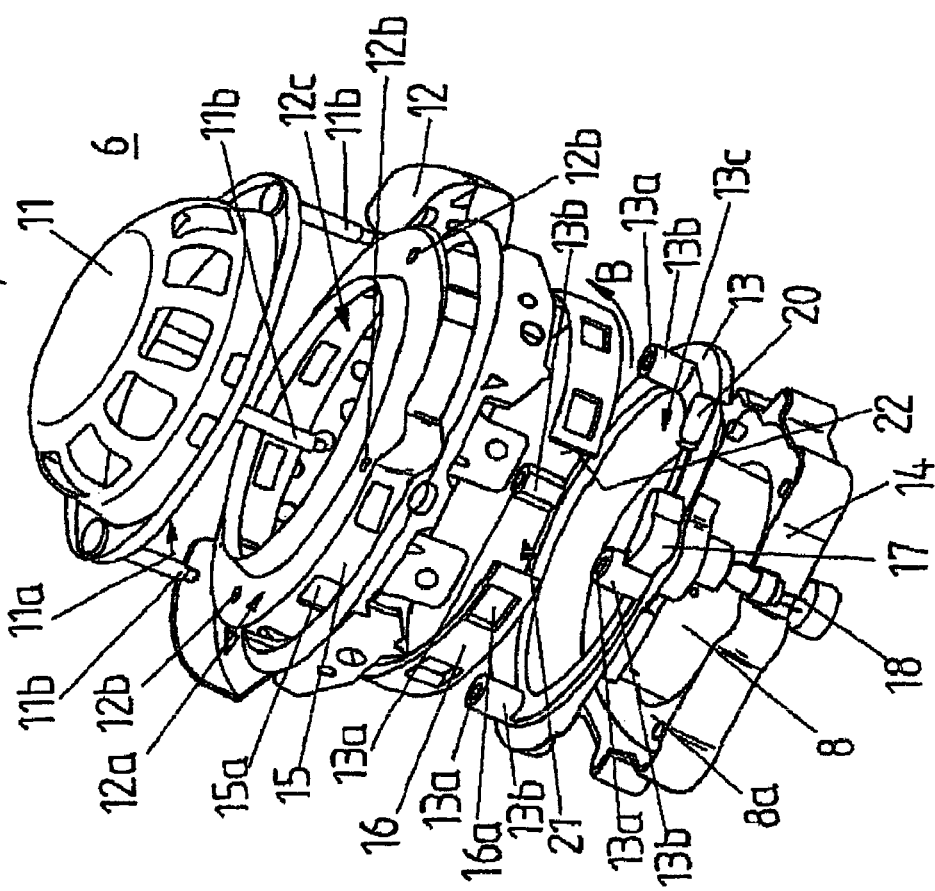
FIG. 5 shows an exploded vie of the airbag module shown in FIGS. 3-4.
Figure 8:
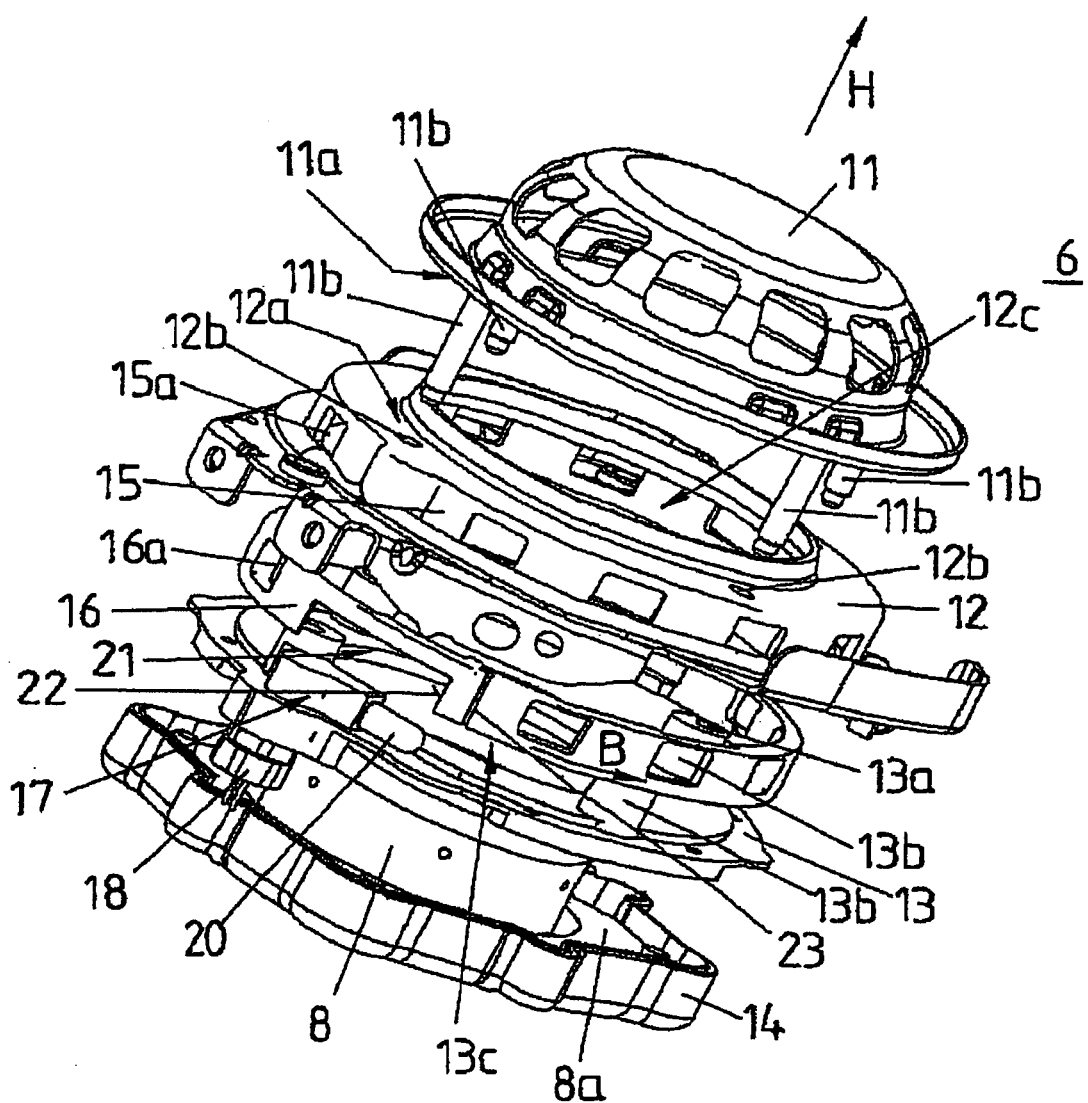
FIG. 8 shows a perspective exploded view of a modification of the airbag module shown in FIGS. 3-6.

FIG. 8 shows a modification of the airbag module 6 shown in FIG. 5, in which, in contrast to FIG. 5, the ring 16 is not interrupted in the movement direction B by the recess 21. The recess 21 of the ring 16 is formed, here, on that margin of the ring 16 which faces the bottom plate 13, specifically in such a way as likewise to form a margin 22, running transversely with respect to the movement direction B, of the recess 21, against which margin the piston 20 can press in order to displace the ring 16. However, in the modification of the airbag module 6, as illustrated in FIG. 8, the ring 16 is not pushed in the movement direction B by the piston 20, as in FIG. 5, but, instead, is pulled by the piston 20 pressing against the margin 22, as, in front of the margin 22 of the recess 21 of the ring 16 in the movement direction B, a further recess 23 in the form of a gap is formed, which runs parallel to the margin 22 and which interrupts the ring 16. As a result, the ring 16 is not pushed in the movement direction B by the piston 20 pressing against the margin 22 in the movement direction B, but, instead, is pulled in the movement direction B by the piston 20 pressing against the margin 22. This is advantageous, as a deformation of the ring 16 brought about by the piston 20 can thereby be reduced effectively.

Figure 9:
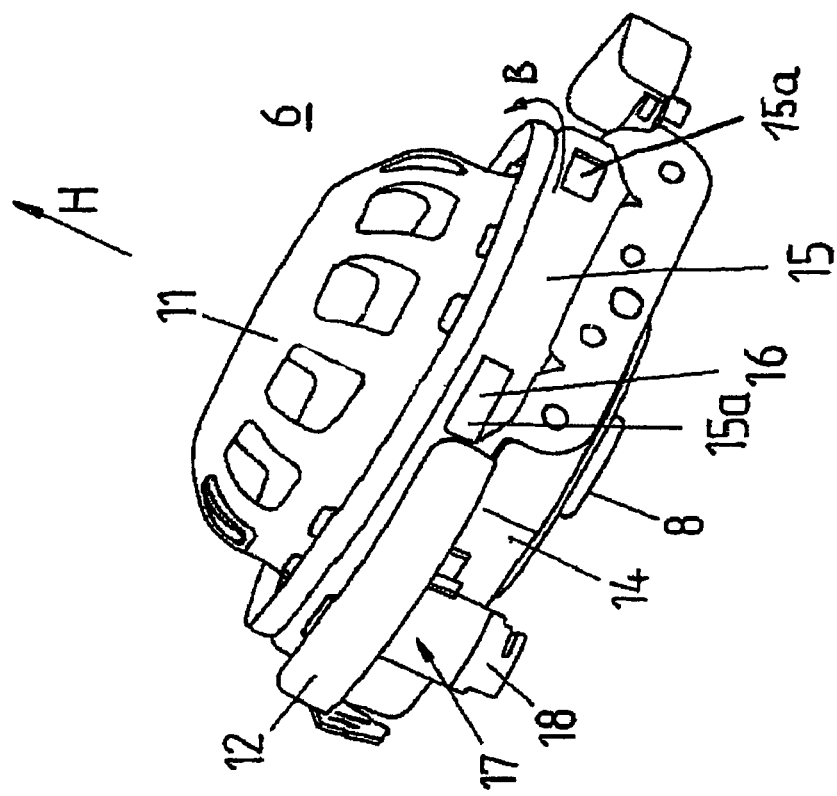
FIG. 9 shows a perspective view of an airbag module according to an embodiment of invention with first outflow orifices which are opened for the discharge of gases.
Figure 10:
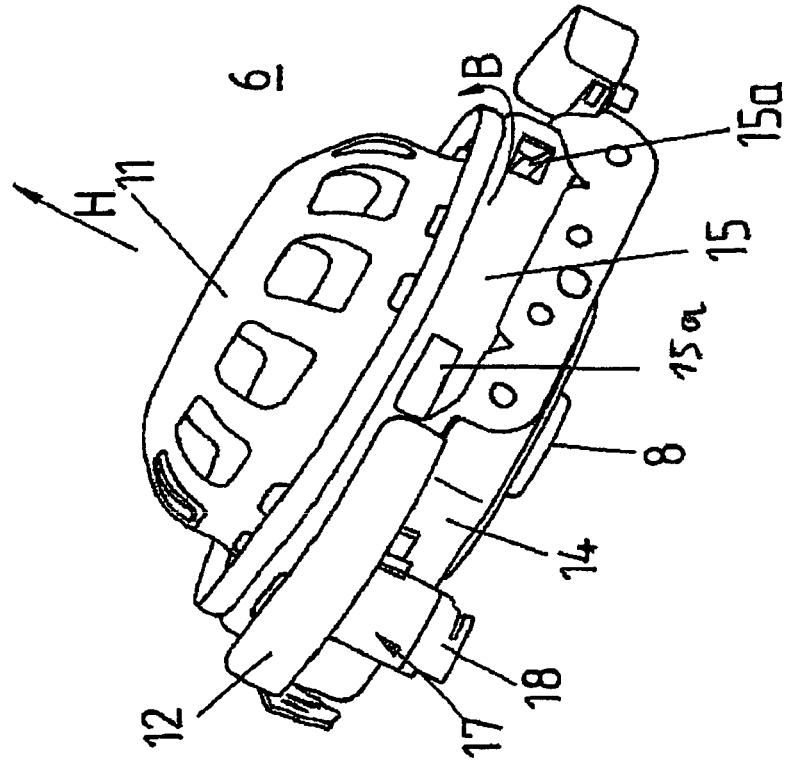
FIG. 10 shows a perspective view of the airbag module shown in FIG. 9 with closed first outflow orifices.
Figure 11:
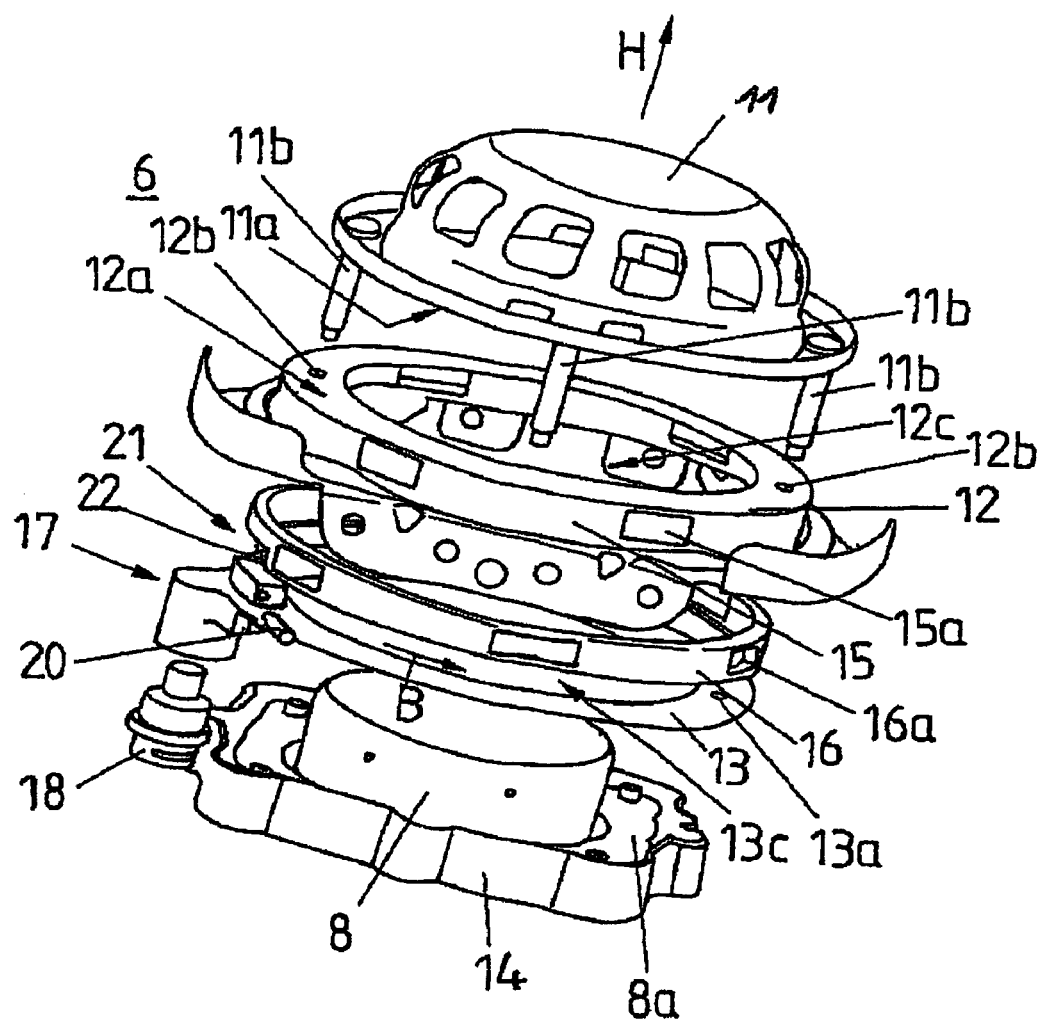
FIG. 11 shows a perspective exploded view of the airbag module shown in FIG. 9-10.

FIG. 9 shows, in conjunction with FIG. 10 and FIG. 11, a further modification of the airbag module 6 shown in FIG. 5 and FIG. 8, in which, in contrast to FIG. 5 or FIG. 8, a recess 21 on the ring 16 is provided, which does not interrupt the ring 16, that is to say the ring 16 is designed so as to be closed on itself, so that the piston 20, which presses against the margin 22 of this recess 21 in order to move the ring 16, pushes the ring 16 in the movement direction B. So that, in this instance, the ring 16 is deformed to a lesser extent by the piston 20 during displacement with respect to the wall 15, said ring has perpendicularly to the movement direction B an essentially U-shaped cross section or a comparable profiling.

Figure 12:
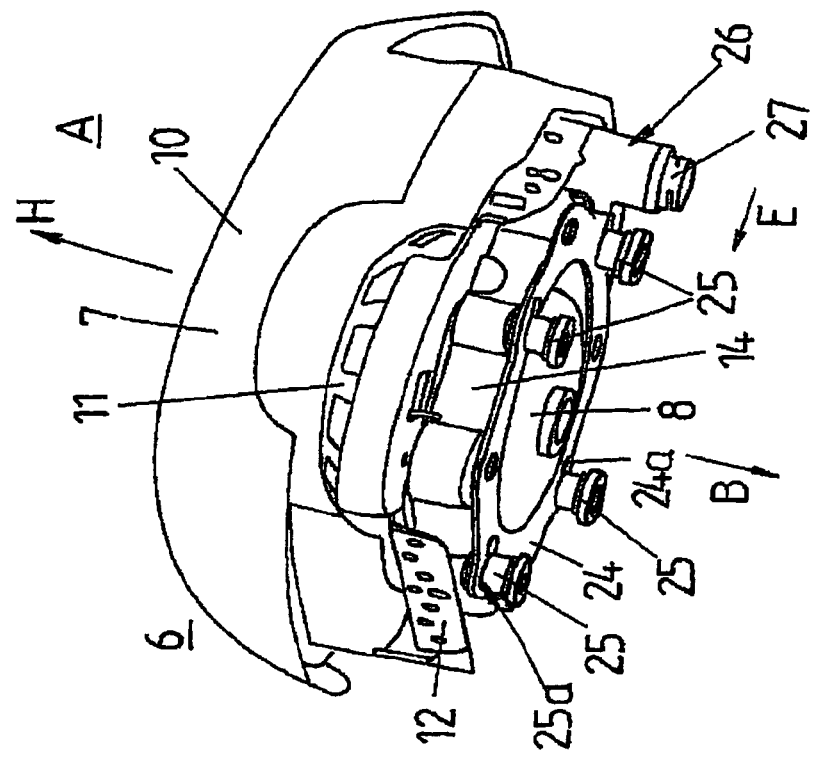
FIG. 12 shows a further variant of an airbag module according to the invention with a movably mounted gas generator and with an opened first outflow orifice.
Figure 13:
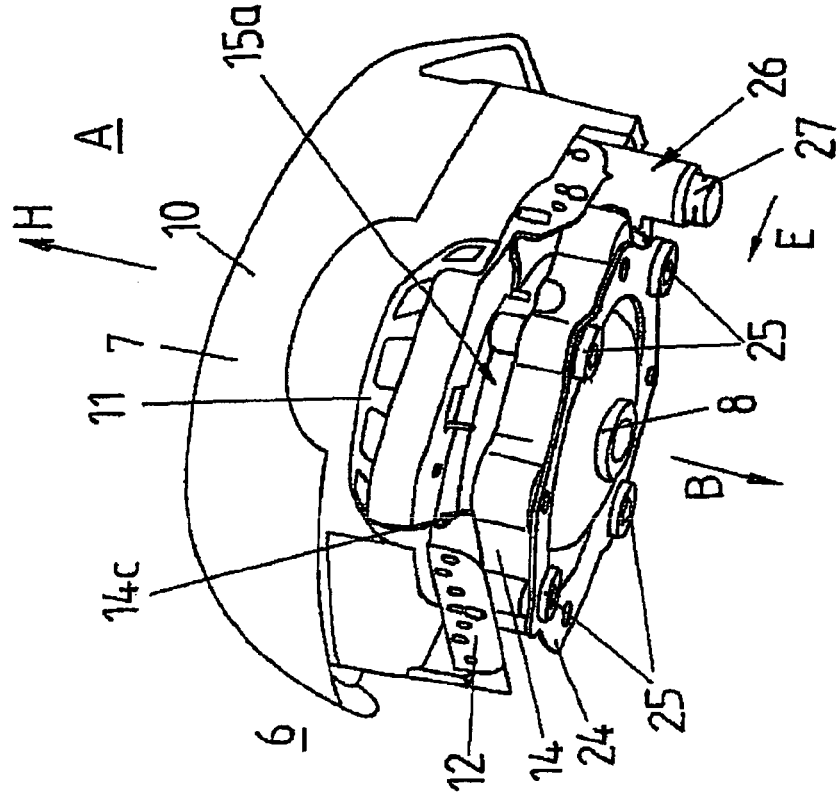
FIG. 13 shows a perspective view of the airbag module shown in FIG. 12 with a closed first outflow orifice.
Figure 14:
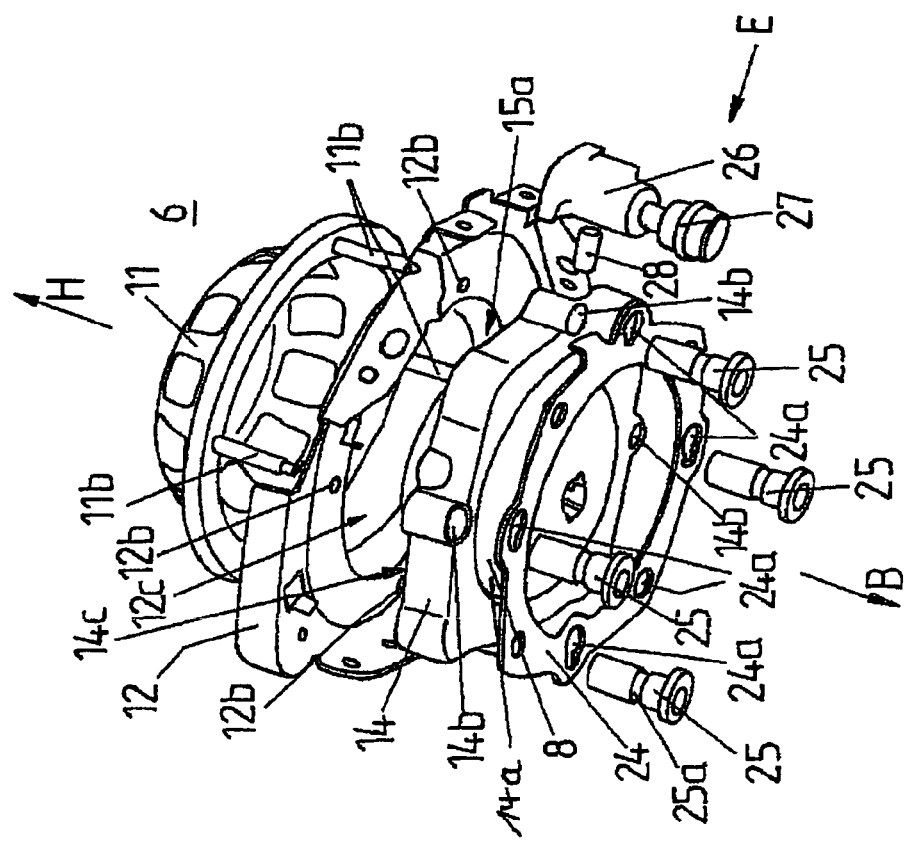
FIG. 14 shows a perspective exploded view of the airbag module shown in FIGS. 12-13.

FIG. 12 shows, in conjunction with FIG. 13 and FIG. 14, an alternative variant of an airbag module 6, in which, in contrast to FIG. 5, FIG. 8 and FIG. 11, the movable element is not formed by a ring 16, but, instead, by the gas generator 8 itself. In contrast to FIGS. 5, 8 and 11, a bottom plate 13 may in this case be eliminated. The chamber 9 surrounding the gas generator 8 is in this instance formed by at least one first and one second chamber element, to be precise the generator carrier 12 as the first chamber element, which in the main deployment direction H lies opposite the carrier 14 of trough-shaped design as the second chamber element, on which is formed a central gas generator recess 14a, through which a free end region of the gas generator 8 projects in the main deployment direction H, the gas generator 8 having a flange 8a which runs continuously around the gas generator 8 and projects from the generator 8 and via which the gas generator 8 is mounted on a marginal region which runs continuously around the gas generator recess 14a and which in the main deployment direction H lies opposite an injection orifice 3, not shown, of the airbag 1 of the airbag module 6 and faces said injection orifice.

The carrier 14 has a continuous marginal region 14c which faces the generator carrier 12 in the main deployment direction H and which can bear against the carrier 12 to form the chamber 9 surrounding the gas generator 8.

The cap-shaped diffuser 11 is seated on the central orifice 12c of the generator carrier 12, and, as described above, the airbag 1 is clamped, with its marginal region running continuously around the injection orifice 3, between the diffuser 11 and the generator carrier 12. As described above, fastening elements 11b project from the diffuser 11, are led through holes 12b of the generator carrier 12, which are in alignment with the fastening elements 11b, through holes 14b of the carrier 14, which are in alignment with these holes 12b, and through elongated holes 24a of a locking element 24, which are in alignment with the holes 14b of the carrier 14, and are screwed together by mechanism of nuts 25 designed so as to extend longitudinally in the main deployment direction H.

The nuts 25 are designed so that, in a state in which they are screwed together with the fastening mechanism 11b, they are introduced in the main deployment direction H into the elongated holes 24a of the locking element 24 and into the holes 14b of the carrier 14 which are in alignment with the fastening elements 11b, so that the carrier 14 can slide in the main deployment direction H on the nuts 25 in the main deployment direction H. That is to say, the nuts 25 form guide elements for the gas generator 8 and the carrier 14 (second chamber element) which can thereby be led, in a movement direction B opposite to the main deployment direction H, through the guide elements 25 by mechanism of a pressure acting during the inflation of the airbag 1.

In order to fix the gas generator 8 in its initial position, in which position the first outflow orifice 15a is closed, during the inflation of the airbag 1, the locking element 24 is provided, which can be brought into engagement with the guide elements 25 so that the gas generator 8 can press (because of the pressure) with the carrier 14 against the locking element 24 in the movement direction B and is in this case held in its initial position with respect to the injection orifice 3, that is to say the carrier 14 connected to the gas generator 8 via the flange 8a of the gas generator 8 bears with its marginal region 14c facing the generator carrier 12 against the generator carrier 12, so that no gas or only comparatively insignificant quantities of gas can escape in the main deployment direction H between the carrier 14 and the generator carrier 12 out of the chamber 9 surrounding the gas generator 8 (there is therefore no need for the marginal region 14c of the carrier 14 to seal against the generator carrier 12).

The locking element 24 is unlocked by mechanism of a (further) movement generation device 26 which in a pressure chamber, by mechanism of an igniter 27, provides an excess pressure which presses a piston 28 out of the pressure chamber of the movement generation device 26 in an unlocking direction E oriented transversely with respect to the movement direction B of the gas generator 8.

For this purpose, the piston 28 of the movement generation device 26 is arranged with respect to the locking element 24 so that the 1 is displaced linearly in the unlocking direction E by the piston 28. The locking element 24 thereby comes out of engagement with notches 25a of the guide elements 25, so that, as a result of the pressure which acts during the inflation of the airbag 1, the gas generator 8 is spaced apart from the injection orifice 3 of the airbag 1 in the movement direction B. In this case, the carrier 14, specifically its marginal region 14c, connected to the gas generator 8 moves away from the generator carrier 12, so as to form between the marginal region 14c of the carrier 14 and the generator carrier 12 a gap which runs continuously around the gas generator 8 and which forms the first outflow orifice 15a. This position of the gas generator 8 or of the carrier 14 is illustrated in FIG. 12. By contrast, FIG. 13 shows in the initial position of the gas generator 8 or of the carrier 14 a marginal region 14c of the carrier 14 bearing against the generator carrier 12. This corresponds to a closed first outflow orifice 15a.

Figure 15:
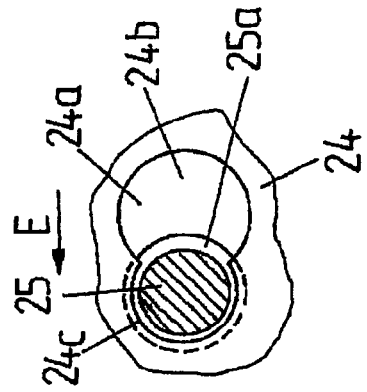
FIG. 15 shows a detail of the airbag module shown in FIG. 14.

FIG. 15 shows a detail of the airbag module 6 illustrated in FIGS. 12 to 14, specifically the principle on which the locking element 24 of essentially annular design, which lies opposite the carrier 14 in the main deployment direction H, can be brought into engagement with the guide elements 25.

For this purpose, the locking element 24 has the elongated holes 24a which extend in the unlocking direction E, the elongated holes A widening in the unlocking direction E and in each case having correspondingly a narrow region 24c which lies opposite a widened region 24b of a elongated hole 24a in the unlocking direction E and is divided off from this widened region 24b by mechanism of a contraction.

The notches 25a of the guide elements 25 are of annular design and run continuously around the guide elements 25 transversely with respect to the movement direction B. The outside diameter of the notches 25a of the guide elements 25 is exactly such that the guide elements 25 can be pressed with their notches 25a into the narrow regions 24c of the elongated holes 24a and, owing to the contractions between the narrow regions 24c and the widened regions 24b, latch into the narrow regions 24c. In this position, then, the guide elements 25 can no longer be displaced in the movement direction B. In the event that the first outflow orifice 15a is to be opened, that is to say the carrier 14 and the gas generator 8 are to be moved away from the generator carrier 12 in the movement direction B, the igniter 27 of the movement generation device 26 is ignited and the piston 28 is thereby pressed in the unlocking direction E against the locking element 24, so that the narrow regions 24c of the elongated holes 24a are pressed out of the notches 25a of the guide elements 25 and the widened regions 24b are displaced toward the guide elements 25. The locking element 24 thus comes out of engagement with the notches 25a of the guide elements 25, as the outside diameter of the guide elements 25, spaced apart from the notches 25a, is smaller than the diameter of the widened regions 24b of the elongated holes 24a. That is to say, the locking element 24 can then slide, together with the carrier 14 and the gas generator 8 fastened to it, on the guide elements 25 in the movement direction B.

Figure 16:
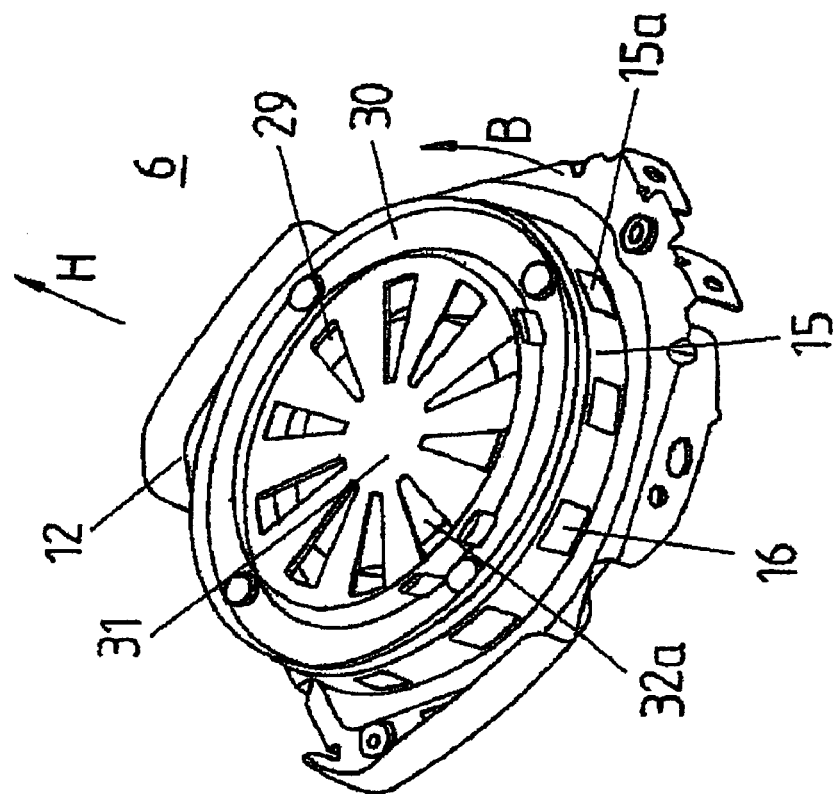
FIG. 16 shows a perspective view of a chamber with controllable flow-out orifices which surrounds a gas generator of a variant of an airbag module according to an embodiment of the invention.
Figure 17:
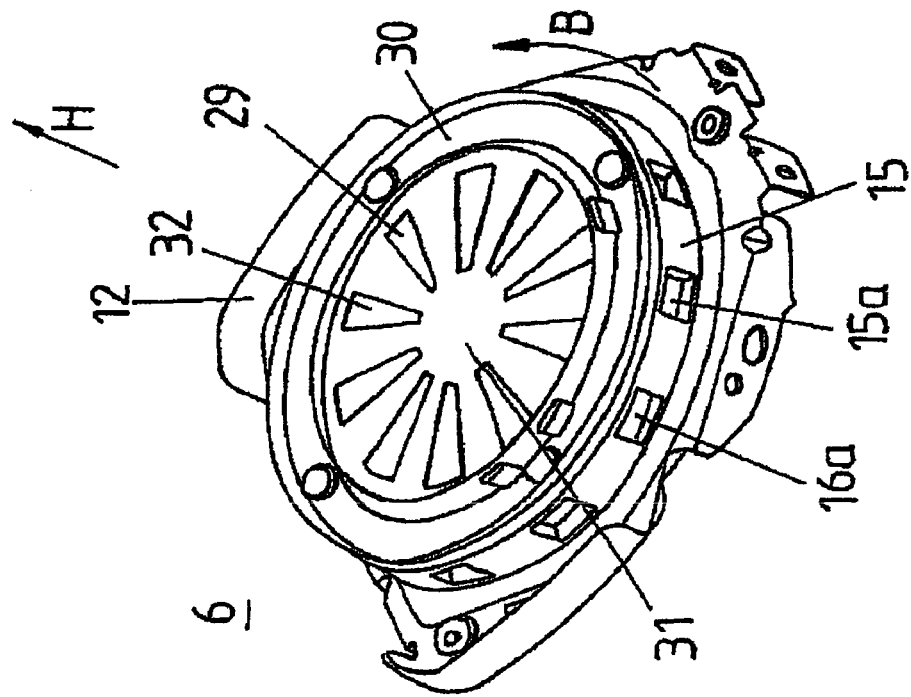
FIG. 17 shows the chamber shown in FIG. 16 with opened flow-out orifices.
Figure 18:
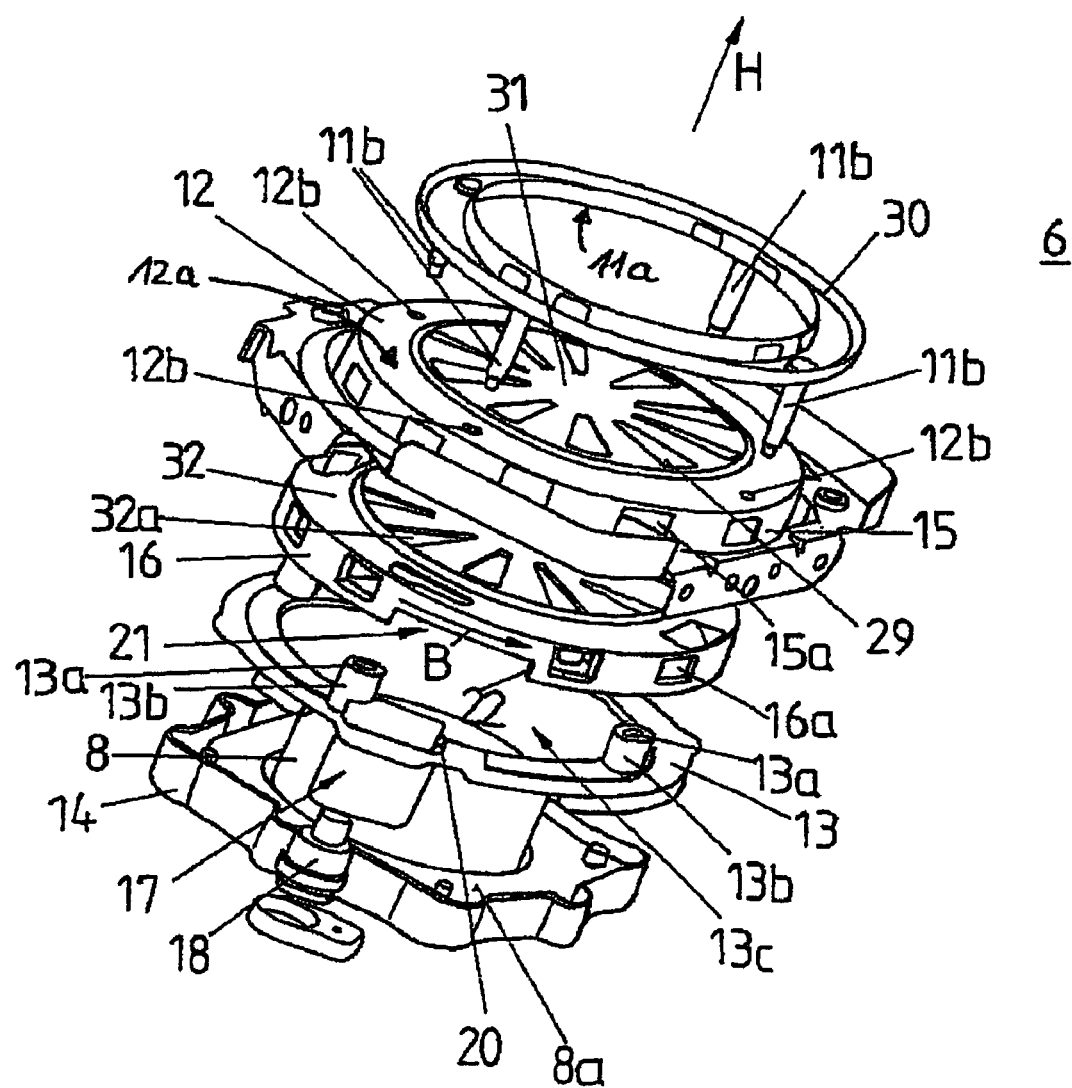
FIG. 18 shows a perspective exploded view of the airbag module shown in FIGS. 16-17.

FIG. 16 shows, in conjunction with FIG. 17 and FIG. 18, a perspective view or exploded view of an extract of an airbag module 6, the generator carrier 12 of which, in contrast to the above-illustrated embodiments of the generator carrier 12, has no permanently open central orifice 12c, but, instead, a plurality of flow-out orifices 29 which are arranged in a radiating manner and through which gas can pass out of the chamber 9 of the airbag module 26 through the injection orifice 3 into the airbag 1. For this purpose, these flow-out orifices 29 face the injection orifice 3 in the main deployment direction H of the airbag 1 and lie opposite this in the main deployment direction H.

The flow-out orifices 29 may be designed so that the gas which passes through these flow-out orifices 29 in order to inflate the airbag 1 is swirled owing to the special configuration of the flow-out orifices 29, so that the diffuser 11 may be dispensed with. That is to say, the airbag module 6 illustrated in FIGS. 16 to 18 has only a clamping ring 30 on which is formed (see FIG. 5) the marginal region 11a which faces the generator carrier 12 and which presses a marginal region, running continuously around the injection orifice 3, of the airbag 1 against the generator carrier 12 and thus secures the airbag 1 to the generator carrier 12.

The fastening elements 11b project from the clamping ring 30 in the main deployment direction H correspondingly to the embodiments of the airbag module 6 which were described above.

To close the flow-out orifices 29 of the generator carrier 12, in contrast to FIGS. 2 to 11, the ring 16 has formed on it a valve plate 32 having a plurality of orifices 32a which can be brought into congruence with the flow-out orifices 29 of the flow-out region 31 of the generator carrier 12. For this purpose, the valve plate 32, together with the ring 16 fastened to it (the ring 16 and valve plate 32 may be produced in one piece), can be rotated in a movement direction B running transversely with respect to the main deployment direction H, that is to say the valve plate 32 can be rotated about an axis which is perpendicular to the valve plate 32 and which coincides with the main deployment direction H, while the orifices 32a of the valve plate 32 can be brought into congruence with the flow-out orifices 29 of the flow-out region 31—the flow-out orifices 29 are opened—or the flow-out orifices 29 can be closed completely by mechanism of the valve plate 32. As the valve plate 32 is coupled to the ring 16, the valve plate 32 can be moved in the movement direction B via the movement generation device 17 illustrated in FIGS. 2 to 11. The flow-out orifices 29 are formed on the flow-out region 31 of the generator carrier 12 so that, with the flow-out orifices 29 closed by the valve plate 32, the first outflow orifices 15a of the cylindrical wall 15 of the generator carrier 12 are opened, and so that the outflow orifices 15a are closed by the ring 16 when the flow-out orifices 29 are opened, that is to say are congruent with the orifices 32a formed on the valve plate 32.

The embodiments described above may be combined. The gas generator 8 may, for example, be designed to be movable in the movement direction B according to FIG. 14, while, in addition, the central orifice 12c of the generator carrier 12 may be equipped by mechanism of an outflow region 31 with corresponding flow-out orifices 29 according to FIG. 18, so that the central orifice 12b, illustrated in FIG. 14, of the generator carrier 12 can be closed by mechanism of a valve plate 32. For this purpose, in each case, a movement generation device according to FIG. 7 is provided.

German Priority Application 10 2005 027 910.4, filed Jun. 10, 2005, including the specification, drawings, claims and abstract, and German Priority Application 20 2005 020 680.6, filed Dec. 15, 2005 including the specification, drawings, claims and abstract, are incorporated by reference herein in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module for a motor vehicle, comprising:
an airbag which can be inflated with gas through an injection orifice of the airbag in order to protect an occupant;
a gas generator for generating gas for inflating the airbag, wherein the generator is configured so that the gas emerges from at least one gas outlet orifice of the gas generator and passes through the injection orifice into the airbag;
wherein the airbag module has a first outflow orifice on a chamber surrounding the gas generator, wherein an element is assigned to the first outflow orifice, the element being movable at least between two different positions and as a result of whose movement between the two positions the first outflow orifice is connectable in a gas-conducting manner to the gas outlet orifice of the gas generator so that the gas flowing out through the gas outlet orifice is conducted at least partially into an outside space;
wherein the airbag has a second outflow orifice which is arranged, in an inflated state of the airbag, in an inside space of the airbag module so that gas emerging from the second outflow orifice passes through an openable region into the outside space;
and wherein the airbag has a third outflow orifice which, with an airbag deployed, is arranged in the outside space of the airbag module for the discharge of gas.

2. The airbag module as claimed in claim 1, wherein the gas outlet orifice of the gas generator is connectable in a gas-conducting manner to the first outflow orifice by mechanism of the movable element so that the gas flowing out through the gas outlet orifice is conducted completely into the outside space.

3. The airbag module as claimed in claim 1, further comprising a cover to separate the outside space of the airbag module from an inside space of the airbag module.

4. The airbag module as claimed in claim 3, wherein the airbag can be deployed through an openable region of the cover into the outside space of the airbag module.

5. The airbag module as claimed in claim 3, wherein the first outflow orifice is arranged in the inside space of the airbag module so that gas emerging from the first outflow orifice passes through the openable region into the outside space.

6. The airbag module as claimed in claim 1, wherein the movable element is mounted so that it is displaceable in a movement direction running parallel to a main deployment direction of the airbag.

7. The airbag module as claimed in claim 1, wherein the movable element is mounted so that it is displaceable and/or rotatable in a movement direction running parallel to the injection orifice.

8. The airbag module as claimed in claim 1, wherein the movable element comprises the gas generator.

9. The airbag module as claimed in claim 8, wherein the gas generator is connected to the chamber so that the first outflow orifice is released as a result of a movement of the gas generator in the movement direction.

10. The airbag module as claimed in claim 9, wherein the gas generator is designed so that the movement of the gas generator in the movement direction takes place by mechanism of a pressure generated during the outflow of gas.

11. The airbag module as claimed in claim 9, wherein the chamber is formed from at least a first and a second chamber element which are mounted movably with respect to one another in the movement direction.

12. The airbag module as claimed in claim 11, wherein the two chamber elements are mounted movably with respect to one another via guide elements extending longitudinally in the movement direction.

13. The airbag module as claimed in claim 11, wherein the airbag is secured to the first chamber element.

14. The airbag module as claimed in claim 11, wherein the gas generator is connected to the second chamber element.

15. The airbag module as claimed in claim 11, wherein the gas generator is connected to the second chamber element so that the second chamber element is spaced apart from the first chamber element as a result of a movement of the gas generator in the movement direction, so that the first outflow orifice is formed between the two chamber elements in the movement direction.

16. The airbag module as claimed in claim 8, further comprising a releasable locking element for securing the gas generator.

17. The airbag module as claimed in claim 16, wherein the locking element is designed so that it can be brought into engagement with the guide elements in order to secure the gas generator.

18. The airbag module as claimed in claim 17, wherein the locking element can be brought at least partially out of engagement with the guide elements by mechanism of a linear movement in an unlocking direction running transversely with respect to the movement direction.

19. The airbag module as claimed in claim 18, wherein the locking element has elongated holes which extend longitudinally in the unlocking direction and into which the guide elements engage in order to secure the gas generator.

20. The airbag module as claimed in claim 19, further comprising a movement generation device for generating the linear movement of the locking element.

21. The airbag module as claimed in claim 20, wherein the movement generation device has a piston which presses against the locking element in the unlocking direction in order to release the locking element.

22. The airbag module as claimed in claim 1, wherein the first outflow orifice is formed on the chamber.

23. The airbag module as claimed in claim 22, wherein the movable element is mounted movably on the chamber so that the first outflow orifice can be closed by mechanism of the movable element.

24. The airbag module as claimed in claim 22, wherein the chamber has a cylindrical wall in which the first outflow orifice is arranged.

25. The airbag module as claimed in claim 24, wherein the movable element has a cylindrical ring with a clearance, the ring being arranged displaceably on the wall of the chamber so that the clearance can be brought into congruence with the first outflow orifice as a result of a displacement of the ring along the wall.

26. The airbag module as claimed in claim 25, wherein, to displace the ring in the movement direction, the ring has a recess with a margin oriented transversely with respect to the movement direction.

27. The airbag module as claimed in claim 26, wherein the recess is designed as a gap which interrupts the ring and which extends transversely with respect to the movement direction.

28. The airbag module as claimed in claim 26, wherein a gap interrupting the ring extends along the margin of the recess.

29. The airbag module as claimed in claim 22, wherein the movable element can be moved by mechanism of a movement generation device.

30. The airbag module as claimed in claim 29, wherein the movement generation device has a piston which presses against the margin of the recess in order to displace the ring in the movement direction.

31. The airbag module as claimed in claim 22, wherein the chamber has a closable flow-out orifice through which gas can pass into the airbag in order to inflate the airbag.

32. The airbag module as claimed in claim 31, wherein the flow-out orifice is arranged on a flow-out region, facing the airbag, of the chamber.

33. The airbag module as claimed in claim 22, wherein the movable element has a valve plate with an orifice, the valve plate being arranged displaceably on the flow-out region of the chamber so that the orifice can be brought into congruence with the flow-out orifice as a result of a displacement of the valve plate along the flow-out region.

34. The airbag module as claimed in claim 33, wherein the valve plate is secured to a continuous margin, facing the airbag, of the ring.

35. The airbag module as claimed in claim 34, wherein the orifice of the valve plate is arranged with respect to the clearance of the ring so that the flow-out orifice is closed by the valve plate when the first outflow orifice is open, and in that the flow-out orifice is open when the first outflow orifice is closed by the ring.

36. The airbag module as claimed in claim 1, wherein a mechanism is provided to prevent the situation where the gas emerging from the first and the second outflow orifices can flow in the direction oriented opposite to the main deployment direction.

37. The airbag module as claimed in claim 1, wherein, in the inflated state of the airbag, the third outflow orifice is arranged on a side of the airbag which faces the airbag module.

38. The airbag module as claimed in claim 37, wherein, for the discharge of gas, the airbag has a further third outflow orifice which, with an airbag deployed, is arranged in the outside space of the airbag module.

39. The airbag module as claimed in claim 38, wherein, in the inflated state of the airbag, the further third outflow orifice lies opposite the third outflow orifice transversely with respect to a main deployment direction of the airbag.

* * * * *